Patented Sept. 19, 1939

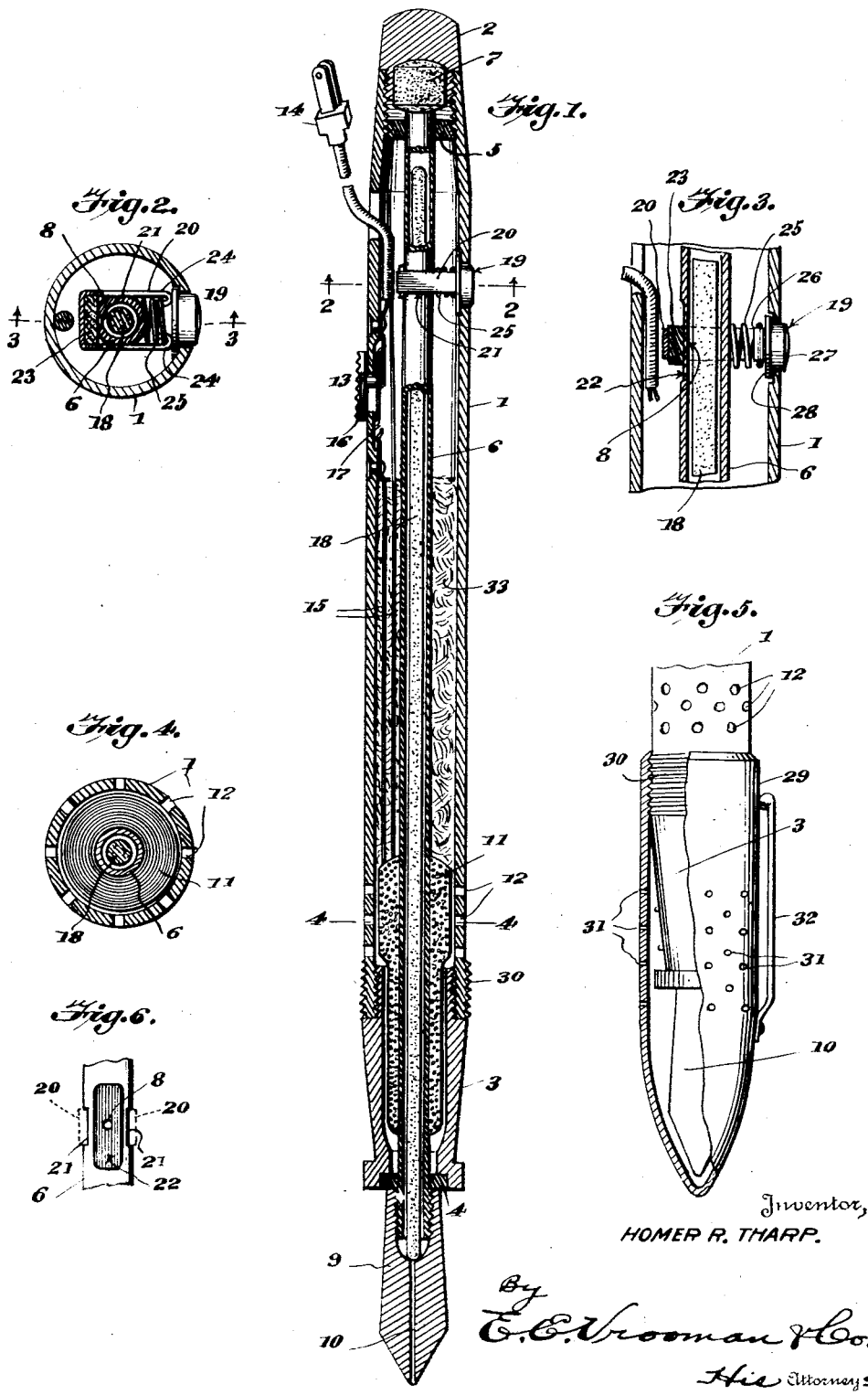

2,173,380

UNITED STATES PATENT OFFICE 2,173,380

ELECTRICAL FOUNTAIN PEN SOLDERING IRON

Homer R. Tharp, San Antonio, Tex.

Application September 19, 1938, Serial No. 230,685

13 Claims. (Cl. 219—27)

This invention relates to an electric fountain-pen soldering iron.

An object of the invention is to provide a small compact soldering implement or iron to be used by electricians, radio repair men, and the like, for general utility work.

Another object of the invention is the provision of a small, compact soldering tool or iron of a design and size approximating an ordinary fountain pen, that can be easily carried in the pocket of the user, for miscellaneous and general utility work.

A still further object of the invention is the construction of a soldering iron with a novel and efficient air release valve device.

Another object of the invention is the construction of what might be called a "vest pocket" size soldering iron, which is highly efficient in operation, and comprises a relatively minimum number of parts, and is comparatively inexpensive to manufacture.

With the foregoing and other objects in view, my invention comprises certain novel constructions, combinations, and arrangements of parts as will be hereinafter fully described, illustrated in the accompanying drawing, and more particularly pointed out in the appended claims.

In the drawing:

Figure 1 is an enlarged, central, vertical, sectional view of a soldering iron constructed in accordance with this invention.

Figure 2 is an enlarged sectional view taken on line 2—2, Figure 1, and looking in the direction of the arrows.

Figure 3 is an enlarged, fragmentary, longitudinal sectional view of the soldering iron.

Figure 4 is an enlarged sectional view taken on line 4—4, Figure 1.

Figure 5 is an enlarged, fragmentary view of the soldering iron, showing partly in section and partly in elevation the protecting cover thereon.

Figure 6 is an enlarged fragmentary view in elevation of the solder-holding metal tube.

Referring to the drawing, in which I have shown the preferred embodiment of my invention, 1 designates a casing of any suitable material, which casing is provided on its outer end with a detachable cap 2. On its inner end there is a detachable composition head 3 provided with a centering washer 4; and near the outer end of casing 1 is another centering or supporting washer 5. The washers 4 and 5 support the solder-holding metal tube 6. A rubber or composition plug 7 is supported by cap 2 against the outer open end of tube 6. The tube 6 is provided with an air vent or aperture 8, and its outer end is threaded to receive the point or solder tip 9, which tip is provided with a canal feeder 10. Within casing 1 and extending around tube 6 is a heating unit 11. On casing 1 there are a series of apertures 12, contiguous to the heating unit 11, for ventilating purposes. A switch device 13 is placed on casing 1 and is electrically connected to the small plug 14, and by wires 15 is also connected to the heating unit 11, whereby when the button 16 is slid to its open position as clearly shown in Figure 1, the circuit will be broken, but when the button is moved towards the outer end of the soldering iron, contact will be had at 17 with one of the wires 15, whereupon the circuit will be closed and if the plug 14 is in circuit with an electrical source, the heating unit 11 will be heated to the desired temperature for melting the stick of solder 18, which is normally in the tube 6.

To permit air to flow into the metal tube 6 for allowing the melted solder to flow out through canal feeder 10 of tip 9, I have provided a novel air-release valve device 19 for normally closing the aperture or air vent 8. This valve device 19 comprises a U-shape yoke frame 20 that is slidably mounted in parallel grooves 21 of the metal tube 6. On one side of tube 6 there is a flat valve seat 22 (Fig. 6). Fixedly secured in frame 20 is a flat rubber valve 23; this valve 23 may be cemented or otherwise secured within frame 20. This flat valve 23 normally rests against the flat valve seat 22, closing the vent 8. The parallel sides of frame 20 are provided on their outer end with inwardly extending hooks 24; these hooks 24 extend into the outer loop of coil spring 25, thereby holding the spring in position within frame 20. The inner end of coil spring 25 bears against the tube 6, while the outer end surrounds extension 26 of button 27; button 27 is provided with a flange 28 (Fig. 3) to keep the button from being displaced off casing 1. It will be seen that when the operator presses inwardly upon button 27, valve 23 will be away from the air vent 8, thereby opening the same, permitting air to pass into the tube 6, allowing the melted solder to flow out through tip 10 onto the work.

In Figure 5 there is shown a protecting cover 29, threaded upon threads 30 of casing 1. This cover 29 is provided with ventilating apertures 31, and also with a pocket clip 32, whereby the soldering iron can be fastened in the operator's pocket without liability of being lost. It is to be understood that this soldering iron is for preferably light or delicate work, and is also, preferably, of such a small and convenient size as can be carried easily in a coat, shirt, or vest pocket of the operator.

When it is desired to reacharge the soldering iron, the operator removes cap 2, carrying plug 7, exposing the outer open end of tube 6, whereupon a new stick of solder can be easily inserted in said tube.

Normally, the switch 13 is kept open, but when the operator desires to use the tool, all he has to do is to close the circuit at 17—presuming that the plug 14 is in circuit with a source of electricity—whereupon the heating unit 11 will be energized, melting the solder. Then he opens the air vent 8, by pressing in on button 27, whereupon the melted solder will flow out of the point 10. By closing the valve device 19 (Figs. 1 to 3), the flow of melted solder will be prevented.

Within casing 1, and around tube 6 is a suitable insulation 33 (Fig. 1). This insulation 33 can be placed against or around the heating unit 11 (not shown) sufficiently to materially assist in the insulation of the heating unit if the operator desires. The heating unit 11 is readily accessible, for by removing the head 3 the heating unit will be disclosed to view.

It will, therefore, be seen that I have provided a very simple, efficient, and novel "pocket" or "fountain-pen" type of a soldering iron, for use by any person, especially repair men, or the like.

While I have described the preferred embodiment of my inventtion and illustrated the same in the accompanying drawing, certain minor changes or alterations may appear to one skilled in the art to which this invention relates during the extensive manufacture of the same and I, therefore, reserve the right to make such changes or alterations as shall fairly fall within the scope of the appended claims.

What I claim is:

1. In a soldering iron, the combination with a casing, of a solder-holding tube within said casing, said tube provided with an air vent in its side, a spring pressed valve device surrounding said tube and over said air vent and normally closing said air vent, and means for electrically heating a portion of said tube.

2. In a soldering iron, the combination of a casing provided at one end with a removable cap and at its opposite end with a removable tip, a heating unit in said casing contiguous to said tip, said casing provided with ventilating apertures contiguous to said heating unit, a metal tube provided near its outer end with an air vent within said casing and having its inner end at said tip, valve means for normally closing said air vent, and electrical means for supplying an electric current to said heating unit.

3. In a soldering iron, the combination of a casing, said casing provided near its ends with supporting washers, a tube open at its ends and extending through and supported upon said washers, said casing provided with a cap carrying a plug, said plug closing the outer end of said tube, a tip on the outer end of said casing over the contiguous end of said tube, said tube provided with an air vent and valve means therefor, and electrical means for heating said tube.

4. In a soldering iron, the combinatiton of a casing, a tube and means within said casing for heating said tube, said tube provided with an air vent in its side, a valve device surrounding said tube and normally closing said air vent, and said valve device provided with a button extending through one side of said casing.

5. In a soldering iron, the combination of a casing, a tube within said casing, means for heating said tube, said tube provided with a flattened portion and an air vent in said flattened portion, said tube provided on opposite sides in alignment with said air vent with parallel grooves, a U-shape yoke frame surrounding said tube and slidably mounted in said parallel grooves, a flat yieldable valve in said yoke frame against said flattened portion of said tube and normally closing said air vent, said U-shape frame having its sides terminating in inwardly extending hooks, a coil spring provided with a portion within said hooks and normally pressing at one end against said tube, a button slidably mounted in the side of said casing, said button provided with an extension in said coil spring, and said button provided with a flange normally engaging said casing whereby the button is prevented from being displaced off the casing.

6. In a soldering iron the combination of a casing, a solder-holding tube within said casing, electrical heating means connected to said tube, said tube provided with an air vent, a valve device engaging said tube for closing said air vent, said valve device comprising a frame movably engaging said tube, a valve within said frame normally closing said air vent of said tube, said frame provided with a spring for holding said valve in its normally closed position, and a button movably mounted in said casing and engaging said frame.

7. In a soldering iron, the combination of a casing, a solder-holding tube within said casing, means for heating a portion of said tube, said tube provided with an air vent between its ends, a valve device slidably mounted between the ends of and on said tube and normally closing said air vent, and a button in the side of said casing and engaging said valve device.

8. In a soldering iron, the combination of a casing, a solder-holding tube within said casing, means for heating a portion of said tube, said tube provided with an air vent, a frame slidably mounted in the sides of said tube, said frame provided with a valve over said air vent, and a manually-operated button in the side of said casing and in engagement with said frame.

9. In a soldering iron, the combination of a casing, a solder-holding tube within said casing, said tube being provided with an air vent between its ends, a valve device on said casing and extending transverse of said tube and normally closing said air vent, said valve device movably transverse of said tube, and electrical means engaging said tube for heating solder within the tube.

10. In a soldering iron, the combinattion of a casing, a tube within said casing, said tube being open at its inner end, a cap on said casing and provided with a separate plug countersunk therein, said cap closing one end of said casing and said plug entirely closing the inner end of said tube, and electrical means on said casing and tube for heating said tube.

11. In a soldering iron, the combination of a casing, a tube within said casing, said tube provided between its ends with an air vent, a bodily movable valve device on said casing and tube and being adapted to move transverse of both said tube and casing, said valve device normally closing said air vent, said valve device including manually engaged means practically flush with the outer face of said casing, whereby the valve device can be operated to open said air vent, and electrical means on said casing and tube whereby a portion of said tube can be heated.

12. In a soldering iron, the combination of a casing, an electrically heated tube in said casing, said tube provided in its side with an air vent, and depressible valve means normally closing said air vent and movable only transverse of said casing and tube.

13. In a soldering iron, the combination of a casing, an electrically heated tube in said casing, said tube being provided with an air vent, a depressible valve device on the side of said casing and normally closing said air vent, and said valve device bodily movable transverse of said casing and tube.

HOMER R. THARP.